Patented Aug. 1, 1944

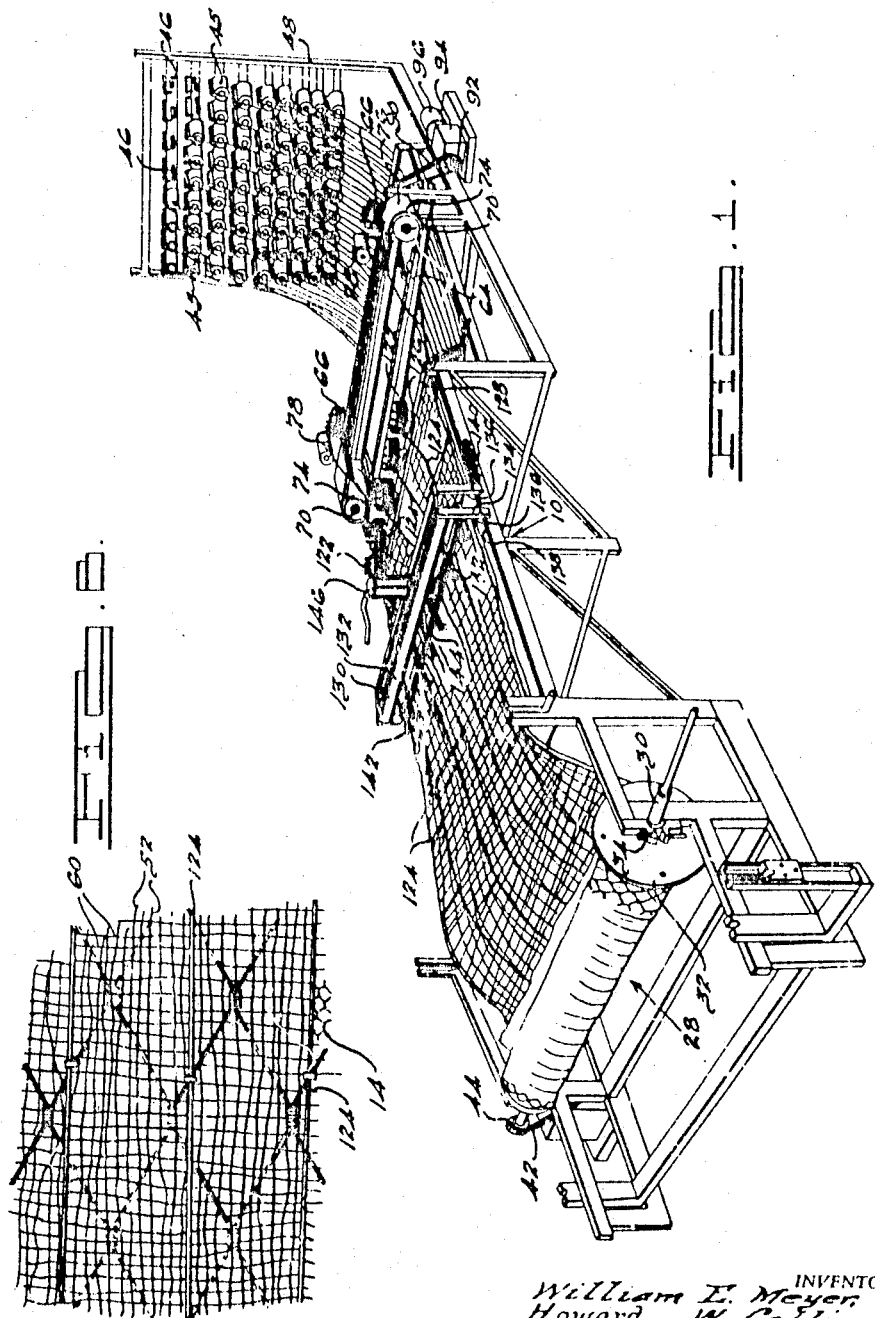

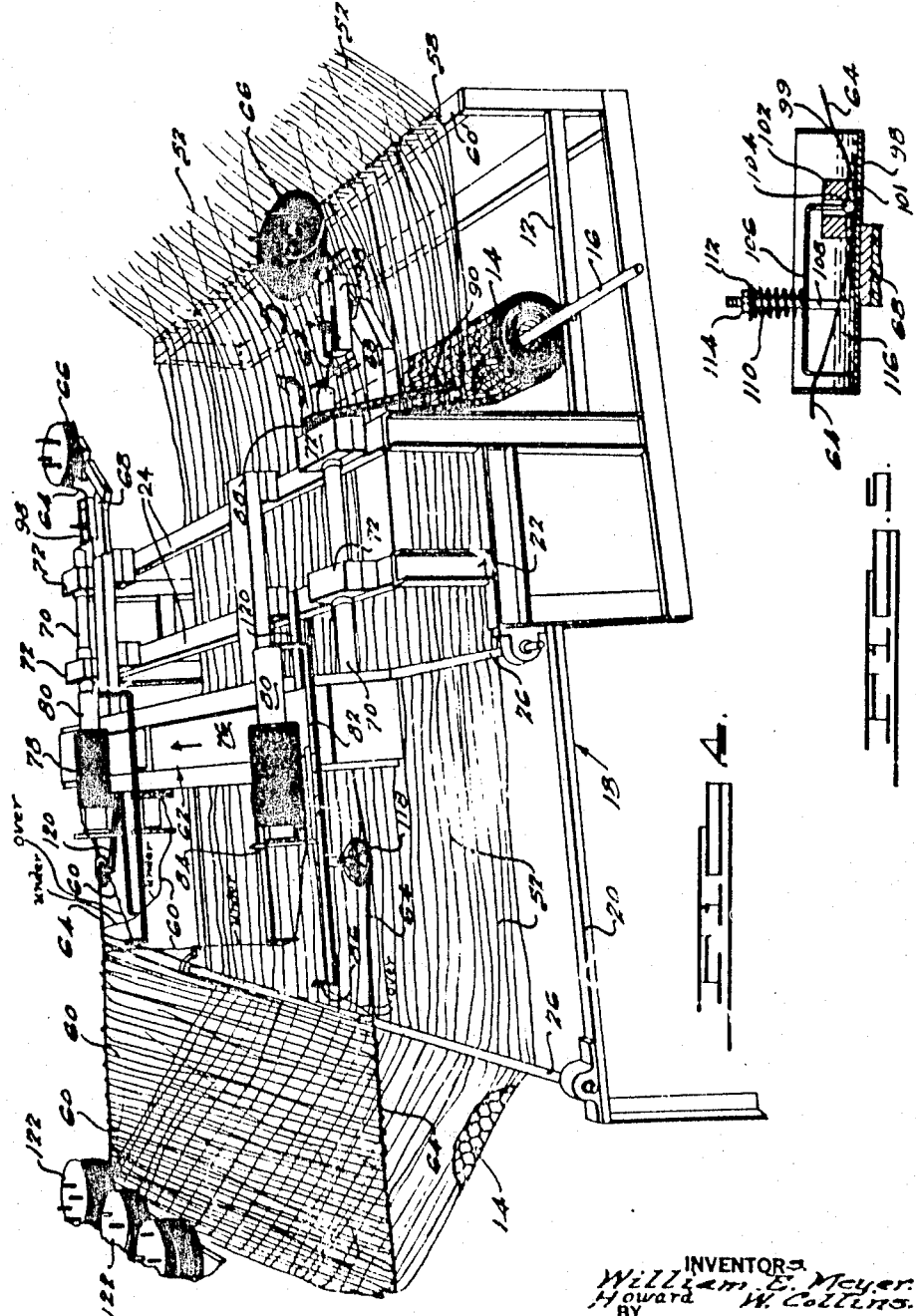

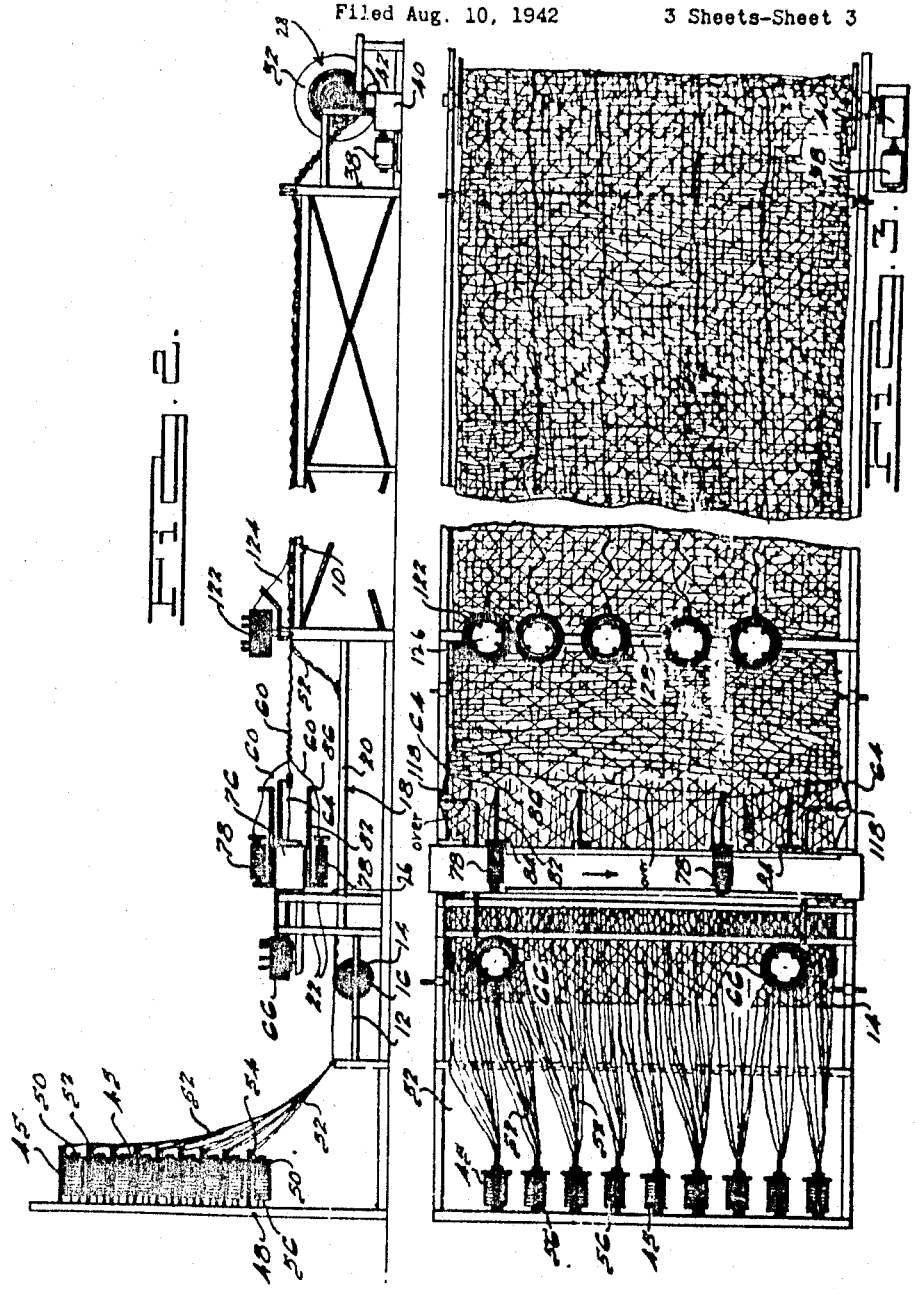

2,354,765

UNITED STATES PATENT OFFICE 2,354,765

CAMOUFLAGE FABRICATING MACHINE

William E. Meyer, Detroit, Mich., and Howard W. Collins, Newark, Ohio; said Meyer assignor to Parker-Wolverine Company, Detroit, Mich., a corporation of Michigan, and said Collins assignor to Owens-Corning Fiberglas Corporation, Toledo, Ohio, a corporation of Delaware Application August 10, 1942, Serial No. 454,276

3 Claims. (Cl. 57—13)

The present invention relates to machines for fabricating camouflage, and particularly to machines for depositing and securing a fibrous material, such as fibrous glass, onto a wire mesh backing member.

One of the primary objects of the present invention is to provide a fabricating machine of the type mentioned by which camouflage may be quickly fabricated in large quantities.

Another object of the invention is to provide improved feed means in machines of the type mentioned whereby cords of fibrous material are disposed onto a wire mesh backing member in a novel manner.

Other objects of the invention will become apparent from the following specification, the drawings relating thereto, and from the claims hereinafter set forth.

In the drawings, in which like numerals are used to designate like parts in the several views throughout:

Figure 1 is a perspective view of one form of machine embodying features of the present invention;

Figure 2 is a broken side elevational view of the structure shown in Figure 1;

Figure 3 is a top plan view of the structure shown in Figure 2;

Figure 4 is a fragmentary perspective view of a portion of the structure shown in Figure 1;

Figure 5 is an enlarged cross-sectional view taken substantially along the line 5—5 of Figure 4; and, Figure 6 is a fragmentary plan view of a portion of the camouflage fabricated in the machine shown in Figures 1 through 5.

According to the present invention, a camouflage fabricating machine is provided in which cords of fibrous glass are deposited onto a wire mesh backing member and are secured thereto. The fibrous glass is in the form of fiber strands, known in the trade as glass fiber sliver, roving or yarn. The wire mesh backing member, in the embodiment illustrated, is in the form of ordinary chicken wire, which is bonderized prior to the application of the fibrous glass thereto. After the fibrous glass is applied to the backing member and secured thereto, it is coiled into rolls and thereafter the camouflage is painted. The present machine is concerned with the application of the fibrous glass to the backing member and the securing of it thereto.

In the illustrated form of the invention, cords of fibrous glass are disposed longitudinally of the wire mesh backing member and other cords are disposed transversely thereof and criss-crossed in superimposed relation to the longitudinal cords. Longitudinal wires are then disposed on the cords and such wires are stapled to the backing member, thereby holding the fibrous glass in place.

Referring to the drawings, in Figures 1 through 6, an illustrative embodiment of the present invention is shown in detail. Such embodiment includes a table support, generally indicated at 10. Another frame 12 is disposed adjacent one end of the table 10 and spaced therefrom. A roll 14 of wire mesh, in the form of chicken wire, is rotatably mounted on a shaft 16 (Figure 4) which may be received within notches formed in the frame member 12 providing bearings therefor. Another mounting frame, generally indicated at 18, is disposed between the table 10 and the frame 12. Such frame 18 includes longitudinal side members 20 and upstanding frame members 22. The upstanding frame members are connected together by transverse frame members 24.

The wire mesh 14 is fed over the table 10, and in passing to the table it passes under transversely extending guide bars 26 which are mounted in brackets on the frame member 18 and which are so disposed that the mesh 14 travels first horizontally and then upwardly onto the surface of the table 10.

The mesh 14 is pulled along the table 10 by a coiling means, generally indicated at 28. Such coiling means 28 is disposed at the opposite end of the table 10 and includes a coiling shaft or drum 30 about which the wire mesh, having the fibrous glass thereon, is wound. The shaft or drum has a disc 32 secured to one end thereof which serves to guide one edge of the mesh as it is being wound on the shaft. The shaft is removably mounted within bearings 34 disposed on a mounting frame. When the shaft is mounted on the bearings, it is operatively connected to a drive means which includes an electric motor 38, a variable speed reducer and a chain drive 42, which drives the shaft through a gear 44.

As the mesh 14 is drawn toward and along the table 10, the cords of fibrous glass are deposited thereon. Such cords of fibrous glass are in the form of a plurality of glass fibres gathered into a staple sliver strand. The cords are wound in spools, and certain of such spools 46 are mounted on spindles 46 which are mounted on transverse members of an upstanding frame 48, disposed in line with the table 10 and beyond the roll of mesh 14.

The spools 46 have discs 50 secured to the ends thereof and the cords 52 of the fibrous glass slide around the peripheral edge of the discs 50 as the cords are unwound from the spools. This assists in proper unwinding of the spools. As the cords pass from the spools, they are passed through guide eyes 54 (Fig. 2), which are in the form of pigtails and are mounted on rods 56. Such rods 56 are mounted to the frame 40 and there is one of such rods for each of the spools. Such eyes 54 serve to properly position the cords for disposition onto the wire mesh, and keep them separated from each other. The cords 52 then pass downwardly to a position substantially level with the top of the roll 14 and are then passed through other guide eyes 58 (Fig. 4), which are also in the form of pigtails. Such guide eyes 58 are mounted on a transverse member 60' of the frame 12 and extend transversely of the mesh 14. Each of the cords is passed through one of the guide eyes 58 and such cords then pass onto the wire mesh 14 extending longitudinally thereof. In getting the machine started, such cords may merely be tied to the wire mesh and such wire mesh will then pull the cords along with it as it travels toward and over the table 10. In the event that any of the cords 52 break during the operation of the machine, it is merely necessary to tie the broken end to the mesh. The mesh 14 with the longitudinally extending cords 52 thereon pass under the guide bars 26 (Figs. 2 and 6) and upwardly onto the surface of the table 10.

Other cords of fibrous glass 60 are disposed transversely of the wire mesh by means, generally indicated at 62, which are mounted on the transverse members 24 of the frame 10.

The cords 60 (Fig. 4) are disposed around longitudinally extending side wires 64. Such wires 64 are pulled from the wire coils 66, which are rotatably mounted on a suitable spindle. Such spindle is mounted upon arms 68, which are secured to the frame 10 adjacent the upstanding frame members 22 and the transverse frame members 24. Such wire members 64 pass through hollow shafts 70, which are mounted within bearings 72. Such bearings 72 are mounted on the transverse frame members 24 adjacent the side ends thereof.

The shafts 70 (Figs. 1 and 4) project forwardly of the frame members 24 and have rolls, or drums, 74 fixed thereto for rotation therewith. Such drums 74 have an endless belt 76 received therearound, and such belt is caused to travel in the direction of the arrow (Figure 3) when one of the rolls 74 is driven by its shaft 79.

Each of the cords 60 is wound on a spool 78, and a plurality of such spools is mounted to the belt 76 for movement therewith. Each spool 78 is mounted on a spindle 80. Each spindle 80 is mounted on an outwardly projecting arm of a mounting bracket 82. Each bracket 82 is secured to the belt 76 for movement therewith.

A guide disc 84 is fixed to the forward end of each of the spindles 80, so that the cord 60 travels therearound as it is unwound from its spool. Each cord is then passed through a guide eye 86, which is formed on the forwardly projecting end of the bracket 82.

As the belt 76 rotates, it will be appreciated that the strands 60 are moved transversely of the mesh 14 and are passed around the side wires 64 in a criss-cross fashion.

The driving drum 74 (Figs. 1 and 4) may be suitably driven through a sprocket 88, which is keyed to one end of the shaft 70. The sprocket 88 is driven through a chain drive 90, which is driven through another sprocket 92 of a variable speed reducer 94. Such reducer 94 is driven by an electric motor 96.

It will be appreciated that the degree of concentration of the transverse members 64 over a given area may be varied by varying the relative speed of the belt 76 and the speed of the mesh along the table.

The wires 64 are secured to the mesh along the edges thereof, so as to pull the wires 74 together with the strands 60 along with the mesh and the longitudinal strands.

In order to provide proper tautness in the wires 64 and for applying an adhesive thereto, each of such wires is passed through a container 98 (Figs. 4 and 5). Such container is best shown in Figure 5, and each of such containers is mounted on one of the arms 68 adjacent the coils 66. The wire 64 is adapted to pass through an aperture 99 formed in one end of the container 98 and then pass through other aligned apertures 101 formed in a nut 102, which is welded to the bottom of the container. A ball 104 is received in the axial aperture of the nut, and such ball frictionally engages the wires 64 as it passes through the nut and resists its movement therethrough sufficiently to provide a tautness in the wires 64. The ball 104 is resiliently urged toward the bottom of the nut by means of a depending finger of a U-shaped member 106.

Such U-shaped member 106 has an aperture therethrough through which an upstanding bolt 108 passes. The head of such bolt may be welded to the bottom of the container 98, and a spiral spring 110 is received therearound above the member 106. The lower end of such spring 110 resiliently bears against the member 106, and the upper end abuts against the washer 112 which is held in place by a nut 114. It will be appreciated that the resiliency may be varied by turning the nut 114.

In order to apply an adhesive to the wires 64, a liquid adhesive 116 is disposed in the receptacle 98. Such adhesive, in the embodiment illustrated, is a tacky varnish.

As the wires 64 leave the hollow shaft 70, they are held to their proper width by guide rollers 118. Such guide rollers 118 are rotatably mounted on brackets 120, which, in turn, are fixed to one of the transverse members 24. The rollers are so positioned that the wires 64 are spaced apart the width of the mesh in the region at which the cords 60 are wound therearound. It will be appreciated that as the cords are wound therearound they engage the wires 64 and the tacky material on such wires will adhere to the glass cords and insure their proper positioning thereon and prevent displacement.

The wires 64, having the cords 60 attached thereto approach the table 10 substantially level therewith, and are superimposed upon the longitudinal strands 52 and the wire mesh 14. The wire mesh having the cords 52 and 60 thereon is then moved along the table 10. In order to secure the longitudinal glass cords to the backing member 14, a plurality of coils 122 of wire 124 are rotatably mounted on vertical spindles 126. Such spindles 126 are mounted on a transverse frame member 128 which is disposed in spaced relation above the table 10 and mounted thereon so that the camouflage passes thereunder.

The ends of the wires 124 may be initially fixed to the mesh 14 so that as the mesh moves therealong it pulls the wires along with it. Such wires 124 are disposed at predetermined spaced intervals across the camouflage and extend substantially parallel to each other and longitudinally of the mesh.

The wires 124 are adapted to be secured to the wire mesh 14 by means of a stapling device, generally indicated at 130. Such stapling device 130 includes a transversely extending frame 132 which is disposed above the top surface of the table 10 and has depending side members 134 provided with rollers 136 on the lower ends thereof. Such rollers 136 are received on trackways 138 formed on the sides of the table 10 so that the frame may move therealong. Coil springs 140 are secured to the table and to the side members 134 to normally pull the frame rearwardly of the table.

The stapling device 130 includes conventional stapling members 142. Such stapling members 142 are of the conventional type having an under-die which cooperates with the forward end of a pivoted magazine arm. The staples, which are U-shaped, are disposed in the magazine and are fed toward the die end thereof. As the pivoted arm is moved downwardly against the die it will be appreciated that the staples are ejected therefrom and clinched in the usual way. The forward ends of the pivoted arms are connected to a transverse bar 144 which is pivotally connected to the depending end of a piston rod of an air cylinder 146. Such air cylinder 146 is provided with the usual ports on opposite sides of the piston and conventional control and valve means is provided for introducing air under pressure to opposite sides of the piston for the purpose of depressing or raising the piston rod to move the bar 144 down or up. The down movement of the bar, of course, effects the stapling operation.

There is one of such stapling devices 142 provided for each of the wires 124 and the end wires 64, and during the stapling operation the wires 124 and 64 are secured to the mesh 14. During the clinching, it will be appreciated that the staples are fixed to the moving mesh. The rollers 136 thus permit limited movement of the stapling device 130 along with the mesh during such engagement. When the staples are released, the spring 140 will return the frame to its initial position for the next stapling operation. The air cylinder 146 may be operated at suitable intervals so that the clinching may take place at suitable intervals along the camouflage.

The camouflage consisting of the wire mesh having the cords of fibrous glass secured thereto is received on the coiled drum, as described above. When a predetermined amount of such camouflage has been coiled, the strip is cut transversely of the table adjacent the coiling device. The coiled roll may then be removed and the coiling shaft replaced for the next roll.

What is claimed is:

1. In a machine for fabricating camouflage, an elongated support, means mounting a wire mesh supply adjacent one end of said support, means for moving said mesh along said support, means mounting a plurality of cords of fibrous material adjacent said one end and above said elongated support, means for feeding said cords of fibrous material longitudinally of said mesh and for superimposing said cords on said mesh, means mounting a plurality of other cords of fibrous material above said support, means for disposing thread elements above the longitudinal edges of said mesh, means for applying said other cords of fibrous material around said thread elements transversely of said mesh and in crossed relation to said first named cords, and means for disposing said other cords on said longitudinal cords.

2. In a machine for fabricating camouflage, an elongated support, means mounting a wire mesh supply adjacent one end of said support, means for moving said mesh along said support, means mounting a plurality of cords of fibrous material adjacent said one end and above said elongated support, means for feeding said cords of fibrous material longitudinally of said mesh and for superimposing said cords on said mesh, means mounting a plurality of other cords of fibrous material above said support, means for disposing thread elements above the longitudinal edges of said mesh, means for applying an adhesive to said thread elements, means for applying said other cords of fibrous material around said thread elements transversely of said mesh and in crossed relation to said first named cords, and means for disposing said other cords on said longitudinal cords.

3. In a machine for fabricating camouflage, an elongated support, means mounting a wire mesh supply adjacent one end of said support, means for moving said mesh along said support, means mounting a plurality of cords of fibrous material adjacent said one end and above said elongated support, means for feeding said cords of fibrous material longitudinally of said mesh and for superimposing said cords on said mesh, means mounting a plurality of other cords of fibrous material above said support, means for disposing thread elements above the longitudinal edges of said mesh, means for applying said other cords of fibrous material around said thread elements transversely of said mesh and in crossed relation to said first named cords, and means for applying threads of wire longitudinally of the mesh in superimposed relation to said cords at spaced intervals thereacross.

WILLIAM E. MEYER.
HOWARD W. COLLINS.